O. S. WAGNER.
AUTOMATIC STOCK WATERING DEVICE.
APPLICATION FILED APR. 25, 1917.
1,245,072.
Patented Oct. 30, 1917.
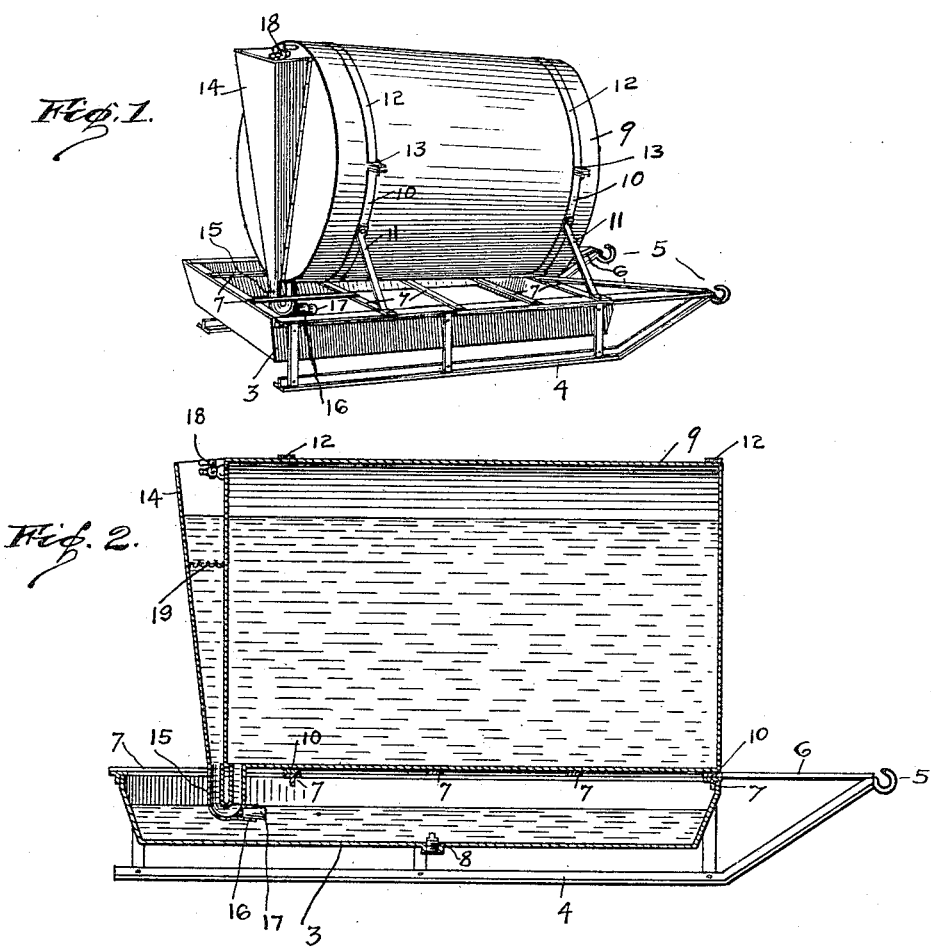
Inventor,
Orlando S. Wagner,
By
Muntura & Woerner
Attorneys.

UNITED STATES PATENT OFFICE.

ORLANDO S. WAGNER, OF FRANKLIN, INDIANA.

AUTOMATIC STOCK-WATERING DEVICE.

1,245,072.

Specification of Letters Patent.

Patented Oct. 30, 1917.

Application filed April 25, 1917. Serial No. 164,316.

*To all whom it may concern:*

Be it known that I, ORLANDO S. WAGNER, a citizen of the United States, residing at Franklin, in the county of Johnson and State of Indiana, have invented certain new and useful Improvements in Automatic Stock-Watering Devices, of which the following is a specification.

This invention relates to improvements in stock watering devices wherein water from an air-tight storage tank is automatically supplied to a drinking trough as the water-level in the latter is so lowered as to admit air to the tank through a pipe, the discharge opening from which is at other times submerged in the water of the trough, and the object of the invention is to fill the storage tank and discharge it through the same pipe.

A further object is to simplify the construction and make a device cheaper to construct, more positive in its action and more durable.

I accomplish the above and other objects which will hereinafter appear, by the mechanism illustrated in the accompanying drawing, in which—

Figure 1 is a perspective view of my invention and Fig. 2 is a longitudinal vertical central section.

The drinking trough 3 is preferably in the form of a shallow rectangular pan mounted on sled runners 4, for easy moving from place to place by hitching to the front hooks 5. Diagonal braces 6, in front, extend from the adjacent end of the trough to the front ends of the runners, and the open top of the trough is divided off into individual spaces for the stock—generally hogs—to drink, by means of horizontal bars 7. The bottom of the trough has a cleanout opening closed by a screw-plug 8.

Supported upon the transverse bars 7 is a horizontal cylindrical drum 9 which forms a reservoir for the storage of water to be supplied to the trough. Strap iron saddles 10 are supported by diagonal braces 11 and receive the drum 9, as shown in Fig. 1. These are continued by the straps 12, over the top of the drum, and the meeting ends of both straps of each pair are bent out in parallel to receive bolts 13 through them by which the ends are drawn together to securely retain the drum in a fixed position relative to the trough.

Attached to one end of the drum is a downwardly tapering conduit 14, here shown as rectangular in cross section with the head of the drum forming one of its sides, thereby keeping it close to the latter as well as economizing in material and insuring positive attachment. It extends from top to bottom of the drum, as shown. The upper end is preferably open, and the lower end discharges into one stem of a hollow U-shaped member 15, the other stem of which discharges into the drum through the under side of the latter, close to the head to which the conduit 14 is fastened. The member 15 is of cast metal, as brass or galvanized iron, and opposite the bend at its lower end it has a discharge opening to a tapering tube 16, which is closed by a plug or cork 17, during the operation of filling the drum. At other times, as when the device is in use for automatic watering, the cork is removed.

The drum is air tight, with the exception of a vent at or near the top, which is provided with a cock 18, by means of which cock the vent may be closed.

When the cock 18 is closed and the cork 17 withdrawn, water in the filling conduit 14 will first pass out through the discharge tube 16 and into trough 3, and if the amount of water discharged is insufficient to seal the discharge opening the required amount of water for closing said opening will then be supplied from tank 9, that is, the water in the drum will flow out into the trough until its level in the latter is just above the top of the discharge opening, and it will then stop by reason of the balance between the external air pressure and the weight of the water in the drum. It will be noted that the drum is filled through the same pipe it discharges through.

To fill the drum, the cock 18 is opened, and the discharge through tube 16, closed, by the insertion of the cork 17, in the latter; then water is poured into the open top of the conduit 14, until the drum is full, which will be indicated by the height of the water in the conduit. A wire strainer 19, in the conduit prevents the entrance of foreign matter that would clog the device.

Having thus fully described my invention, what I claim as new and wish to secure by Letters Patent, is—

1. In an automatic stock-watering device, the combination of a trough, an air-tight water supply vessel above the trough having a top air-vent, means for opening and closing said air-vent, a filling conduit extending below the supply vessel and also below the water level of the trough and having a return portion communicating with the bottom of the water supply vessel, a discharge into the trough at the lower end of the filling conduit, and means for opening and closing said discharge.

2. In an automatic stock-watering device, the combination of a trough mounted on runners and having top cross bars, an air-tight cylindrical drum supported above the trough on said cross-bars, said drum having an air-cock near its top, a filling conduit secured to an end of the drum diametrically thereof, a U-shaped member extending below the water level of the trough having one stem connected and communicating with the conduit and the other stem with the drum, a discharge at the bend of the U-shaped member and means for closing the discharge.

In witness whereof, I have hereunto set my hand and seal at Indianapolis, Indiana, this 12th day of March, A. D. one thousand nine hundred and seventeen.

ORLANDO S. WAGNER. [L. S.]

Copies of this patent may be obtained for five cents each, by addressing the "Commissioner of Patents, Washington, D. C."